US012754770B2

(12) United States Patent
Sellari et al.

(10) Patent No.: US 12,754,770 B2
(45) **Date of Patent: *Oct. 6, 2026**

(54) CLOUD APPLICATION THRESHOLD BASED THROTTLING

(71) Applicant: Tangoe US, Inc., Stamford, CT (US)

(72) Inventors: Paolo Sellari, Shelton, CT (US); Jaan Leemet, Aventura, FL (US)

(73) Assignee: Tangoe US, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/960,929

(22) Filed: Nov. 26, 2024

(65) Prior Publication Data

US 2025/0086019 A1 Mar. 13, 2025

Related U.S. Application Data

(63) Continuation of application No. 17/572,343, filed on Jan. 10, 2022, now Pat. No. 12,277,448.

(51) Int. Cl.
*G06F 9/50* (2006.01)

(52) U.S. Cl.
CPC .......... *G06F 9/5038* (2013.01); *G06F 9/5016* (2013.01); *G06F 9/5044* (2013.01); *G06F 2209/5022* (2013.01); *G06F 2209/508* (2013.01)

(58) Field of Classification Search
CPC .... G06F 9/5038; G06F 9/5016; G06F 9/5044; G06F 2209/5022; G06F 2209/508
See application file for complete search history.

(56) References Cited

U.S. PATENT DOCUMENTS

2020/0067778 A1 2/2020 Kothari
2021/0011772 A1* 1/2021 Zhou .................... G06F 9/5027
2021/0294645 A1* 9/2021 Agrawal .............. G06F 16/907
2022/0222097 A1 7/2022 Lokesharadhya

FOREIGN PATENT DOCUMENTS

CN 101206294 A 6/2008

* cited by examiner

*Primary Examiner* — Masud K Khan
(74) *Attorney, Agent, or Firm* — Farber LLC

(57) ABSTRACT

Systems and methods are provided for intercepting computing requests and modifying the execution timing thereof based on thresholds and minimum performance criteria and/or adjusting hosted services plans in order to monitor and control costs of hosting software applications on hosted provider computing resources.

20 Claims, 5 Drawing Sheets

CLOUD APPLICATION THRESHOLD BASED THROTTLING

FIELD OF THE INVENTION

The following relates to managing usage of computing resources by cloud based application, particularly the following relates to delaying or altering the execution of certain computing requests in order to keep computing resource usage under control to thereby manage costs.

BACKGROUND OF THE INVENTION

Hosted SaaS applications (Software as a service) have become a growing part of everyday life. As a result, many businesses have moved what used to be locally installed and executed software programs to a cloud hosting model. Many of these applications are executed on servers which are provided or rented by a third party in what is commonly referred to IaaS (Infrastructure as a Service) and PaaS (Platform as a Service). In this model, companies offering the ability to host and provide computing infrastructure will often charge for the usage of resources. This usage may be based on dynamic or elastic expansion/contraction in said computing resources used or may be based on a certain number of machines or resources reserved for the applications use. Either way, the SaaS application will have an associated cost for utilizing these computing resources. Further, the type of resource utilization used in provider billing varies from one provider to the next making cost estimation across providers difficult due to the inconsistent billing models.

However, resource usage is difficult to determine and characterize because it is not a fixed value or a fixed rate. For example, most applications will not run at 50% CPU and 3 GB memory on a constant basis. There are a series of ebbs and flows associated with usage of the typical software application. IaaS and PaaS providers have charged for these ebbs and flows, for example by allowing the application to scale up/down based on usage or as another example by reserving resources which are sufficient to meet the maximum expected performance needed.

In many cases the cost or charge for usage is based on the maximum of a particular value. For example, the bandwidth charged may be based on a maximum bandwidth, or memory/RAM charged for could be based on the maximum.

SUMMARY OF THE INVENTION

It is therefore an object to be able to control computing usage requests by a hosted software application to reduce expense while maintaining adequate performance.

It is a further object to reduce maximum values of cost driving parameters of computing resource usage.

It is yet another object of the invention to provide flexibility to thresholds in order to maintain acceptable performance levels while balancing cost considerations.

Therefore, it is an object of the present invention to provide improved methods and controls to capture and control resource usage of applications running in a cloud provider hosting infrastructure.

It is a further object of the present invention to provide a system and method for generating alerts and automating actions based on resource monitoring from data available from a variety of sources of information.

It is a further object of the system to gather and collect in real time these resource utilization metrics of applications and map them to billing models and plans of known hosting providers.

It is still further desired to provide a system and method that incorporates machine learning to predict and establish usage patterns from the resource utilization metrics gathered over time, and to create a set of upper and lower bounds mapped over time as guard rails for the expected resource utilization for given applications.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time unless otherwise stated.

A system is provided including a set of robotic software programs running on one or more computers and a cloud-based software program collecting resource utilization data about running applications and running mappings with known billing models.

In one embodiment, the system collects resource utilization statistics and details from alerts received from the hosting provider upon which the application is running.

In another embodiment, the system relies on application self-monitoring either through built in functions in the app to report and control resource usage behavior.

In yet another embodiment, the system uses a wrapper/container in which the app runs which acts as an intermediary for resource requests. The container/wrapper is thus able to monitor these and provide control over them.

In one configuration a system and method are provided to generate threshold-based alerts if the system is using more or less of a given resource. These alerts may be logged and/or sent as notifications to one or more users or administrators of the system In another configuration a system and method are used to throttle and control application resource use when the thresholds are exceeded for one or more resources.

In yet another configuration a system and method are provided to access and modify the hosting system parameters relating to the application on the hosting provider. The hosting plan can be modified automatically to have more or less of a given resource to match the needs as determined by the system.

The system and method further comprises the development of a machine learning algorithm to improve the decision making as to when to adjust plans and when to take action. Over time and over iterative attempts of changing plans trends and patterns are learned that help determine if changes in application usage are permanent or transitory. For example, the system would make adjustments based on past behavior and then compare and see if these changed resulted in actual savings. If so, these changes would be left and subsequent to similar behavior the same changes would be implemented again. In other cases, if the changes did NOT result in savings, they would be backed out and subsequent behavior would not result in changes.

In one specific example, if a sudden burst of activity occurs in a given month, at a predictable time where e.g. application memory use is much larger than usual. In such a case, the system might suggest moving the application to a more expensive plan the following month. The following month the application goes back to its normal usage pattern. In such a case, the change made would not have saved any money but rather made it more expensive for the month where behavior goes back to normal. In such a case the system would learn to avoid making such a change as soon as additional memory was used and might monitor memory usage over a longer period to see if the change in behavior is consistent over a longer period before making such a change. With more and more data the predictions can become more accurate. If we assume that our of 10 situations where memory use increased in month, and in 8 cases out of 10 the change resulted in consistently increased memory usage such that moving to a new plan was beneficial, then 80% of the time such a move had been beneficial.

Behaviors that are monitored are thus assigned weights and if the added weights point to a net benefit of changing plans, then the action is done. As the system learns, and changes such as described above are transitory and should not warrant changes, the weights are reduced on those behaviors. If they are beneficial, the weights are increased.

As a further example, say the system now monitors both the overall memory usage and the changes to the system. We may find that when changes are introduced, there is a sudden peak of usage as users investigate new features, but the following month these usually taper down and thus we may discount the usual weights associated with memory use increases.

The system and method further comprises the development of a reporting and alerting system which allows administrators to take manual action on certain events with key information on hand. This allows them to approach the appropriate departments or personnel to see if changes in policy may have been made leading to an ongoing expected change in usage.

The system and method still further comprises the step of adjusting the threshold parameters dynamically based on the machine learning algorithm, the manual inputs of administrators, and the ongoing changes in plans and plan parameters by the system.

Therefore, the stated and other objects of the invention are achieved by providing a computer implemented method for managing hosted computing resource usage by applications the method can include the steps of: intercepting, with a software program executing on a computer, computing requests by a software application executing on at least one of a plurality of computing resources associated with a first hosting provider, the software application associated with a first hosting plan which relates use of the computing resources to a cost of executing said software application on the at least one of the plurality of computing resources; and determining, with the software program, a delay for one or more of the computing requests so that one or more parameters of use of the computing resources remain below one or more thresholds associated with the first hosting plan, wherein the first hosting plan relates the one or more parameters of use to the cost.

In certain aspects the one or more parameters of use are selected from the group consisting of bandwidth, disk, memory (RAM) and processing (CPU). In other aspects the one or more thresholds are indicative of a total amount of usage of the one or more parameters for a defined period of time. In yet other aspects the software program is part of the software application. In still other aspects the method includes delaying the one or more of the computer request in accordance with the delay. In still other aspects the threshold is set based on instructions from a controller computer via a network based on data received from the software program concerning one or more implemented delays and performance of the software program with the one or more implemented delays. In yet other aspects the method includes determining that a minimum performance level cannot be met with the delay and then changing the first hosting plan or the threshold. In still other aspects the computer is one of the plurality of computing resources.

Objects of the invention are achieved by providing a system for managing hosted computing resource usage by applications. The system can include a software program executing on a computer, the software program intercepts computing requests by a software application executing on at least one of a plurality of computing resources associated with a first hosting provider, the software application associated with a first hosting plan which relates use of the computing resources to a cost of executing said software application on the at least one of the plurality of computing resources. The software program further determines a delay for one or more of the computing requests so that one or more parameters of use of the computing resources remain below one or more thresholds associated with the first hosting plan.

In certain aspects the software program delays the one or more of the computer request in accordance with the delay so that use of the computing resources remain below the one or more thresholds associated with the first hosting plan but above a minimum performance level for the software application. In other aspects the software modifies the first hosting plan if a minimum performance level for the software application cannot be met with the delay. In still other aspects the minimum performance level is a multiple of an average or median load time for one or more categories of requests. In still other aspects the one or more thresholds are indicative of a limit on cost. In yet other aspects the one or more thresholds are a limit on bandwidth, disk, memory, processing or combinations thereof. In yet other aspects the delay is based on historical usage of computing resources by the software application.

Other objects of the invention are achieved by providing a system for managing hosted computing resource usage by applications including a software program executing on a computer, the software program intercepts a plurality of computing requests by a software application executing on at least one of a plurality of computing resources associated with a first hosting provider, the software application associated with a first hosting plan which relates use of the computing resources to a cost of executing said software application on the at least one of the plurality of computing resources. The software program determines a delay for two or more of the plurality of computing requests so that one or more parameters of use of the computing resources remain below one or more thresholds associated with the first hosting plan, the delay determined based on the plurality of computing requests being within a range of times such that un-delayed execution of the plurality of computing requests would overlap, the delay implemented by the software program implementing the two or more of the plurality of computing requests such that a first one of the two or more of the plurality of computing requests is finished execution prior to a second one of the two or more of the plurality of computing requests beginning execution.

In certain aspects the two or more of the plurality of computing requests are selected by the software program based on a threshold associated with a maximum bandwidth. In yet other aspects the maximum bandwidth is modified based on a contribution to the cost of executing said software application on the at least one of the plurality of computing resources, the contribution being associated with parameters of use other than bandwidth. In yet other aspects the one or more thresholds are received from a controller computer which is in communication with the software program via a network. In still other aspects the computer is one of the plurality of computing resources.

Other objects are achieved by providing a system for managing hosted computing resource usage plans. A software program executes on a computer. The software program monitors computing requests by a software application executing on at least one of a plurality of computing resources associated with a first hosting provider. The software application is associated with a first hosting plan which relates use of the computing resources to a cost of executing said software application on the at least one of the plurality of computing resources. The software program compares use of the computing resources the first hosting plan and historical use of at least one of the computing resources to an alternate hosting plan to from the first hosting provider to determine if the alternate hosting plan is likely to be less expensive based on the use and the historical use and the software program transmitting instructions to a first hosting provider computer to switch from the first hosting plan to the alternate hosting plan.

In certain aspects the software program determines the alternate hosting plan is likely to be less expensive based on the software application intercepting computing requests and implementing a delay for one or more computing requests to maintain usage of the computing resources remain within one or more usage thresholds associated with the alternate hosting plan. In other aspects the computer is one of the plurality of computing resources.

Other objects of the invention and its particular features and advantages will become more apparent from consideration of the following drawings and accompanying detailed description.

DETAILED DESCRIPTION OF THE INVENTION

Figure 1A:
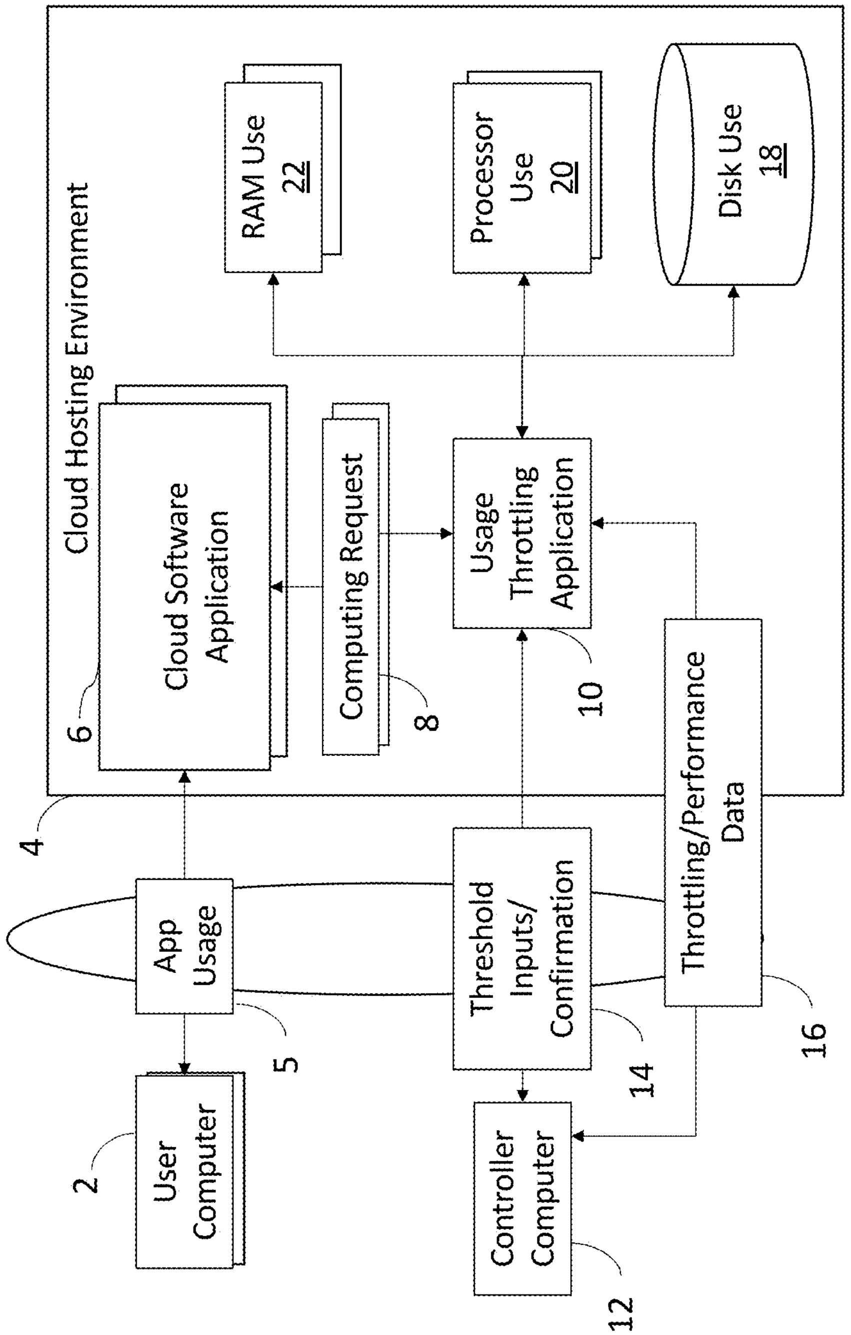
FIG. 1A is a functional flow diagram according to the present invention.
Figure 1B:
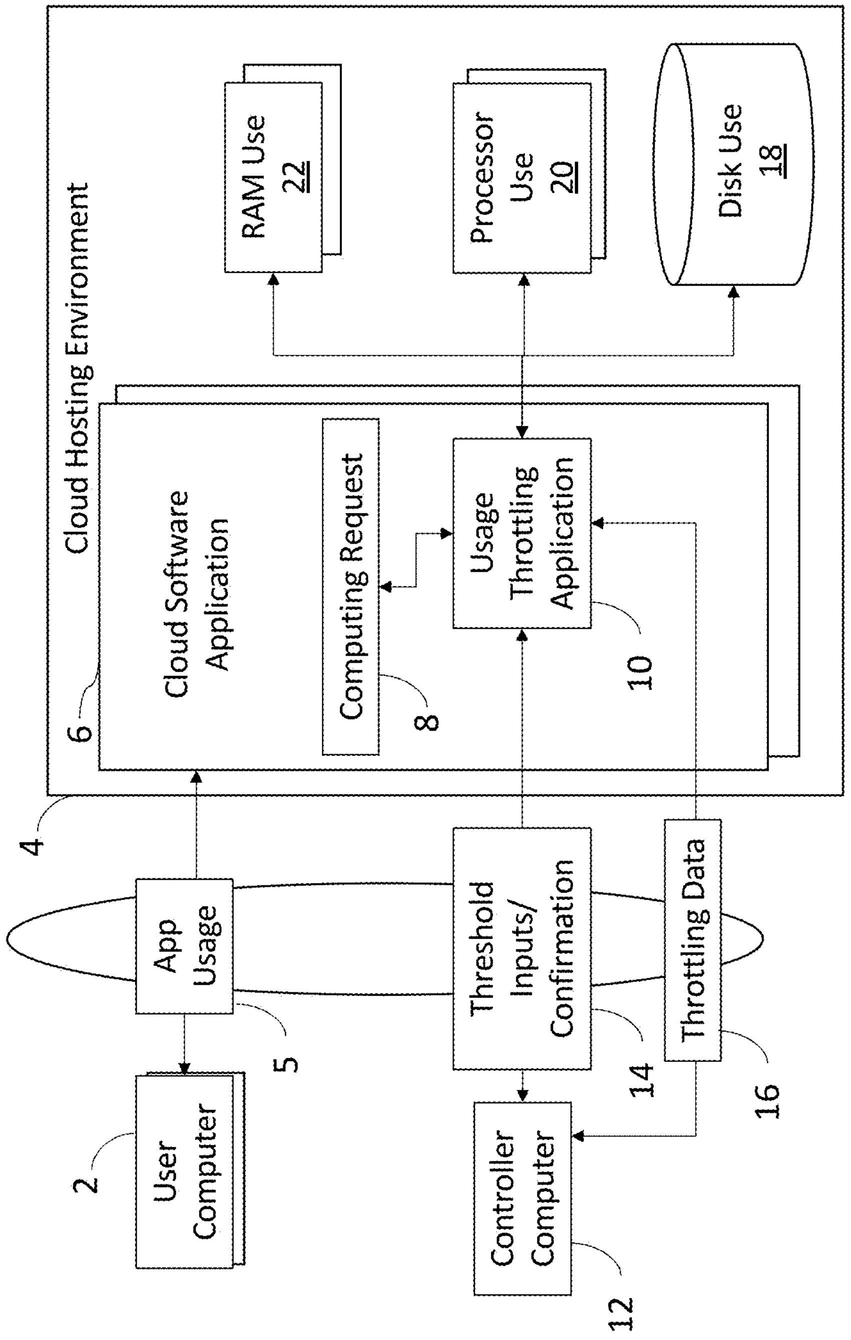
FIG. 1B is another functional flow diagram according to the present invention.

Referring now to the drawings, wherein like reference numerals designate corresponding structure throughout the views. The following examples are presented to further illustrate and explain the present invention and should not be taken as limiting in any regard.

The present invention relates to systems and methods for providing alerts and notifications on cloud-based software as a service expense management. RPA (Robotic Process Automation) agents, ETL components, services, and functions are deployed to monitor application activities detecting and establishing trends, patterns, and recognizing anomalies through resource monitoring. The RPA agents report metrics to a software program knowledgeable of the billing model and available plans from the hosting provider. They in turn correlate usage and expected or projected usage of the monitored applications onto the one or more service platform billing systems used to model or predict costs. Further, the RPA automates decision making applying machine learning to select whether to change service provider plans or parameters, whether to throttle or exert controls on the application, or to let the application run over the thresholds in order to optimize costs.

The software program provides systems and methods to correlate the resource utilization metrics, whether from the RPA bots or from service provider platform notification systems, comparing the resource usage (such as computing load, bandwidth) with expected threshold values to determine if notifications should be sent to alert administrators or trigger automated actions, such as throttling usage or taking countermeasures to curb excessive usage, changing plan parameters, or simply accounting for any usage anomalies. Dynamic adjustment of thresholds based on known patterns such as daily or weekly busy periods are accounted for in the systems projections and analysis. Thresholds to monitor both unexpectedly large resource usage or unexpectedly small usage which are respectively above or below the established thresholds is captured and reacted to accordingly.

Cloud computing platforms have become increasingly prevalent in the IT space allowing companies to run their applications on state-of-the-art infrastructures at a reasonable monthly cost, rather than making initial up front capital investments in building out their own hardware infrastructure.

With the hosted model, maintenance and upgrades of these services are all taken care of by the hosting providers in a turn-key fashion with the costs factored into a monthly operational expense. Various service models are offered that can respect SLA (Service Level Agreements) to meet a customer's needs. The customer does not have to build out an experienced IT team to manage and maintain their apps and does not need to worry about applying security patches, doing backups, or upgrading and replacing the hardware. The burden of ensuring uptime, availability, and redundancy and much of the liability for doing so rests with the hosting provider. The customer, or application provider, simply manages their own application within the given infrastructure.

The hosting providers provide billing models which factor in the application size, amount of memory and disk needed, and the computing power required. A myriad of metrics is often applied to these billing models, which, now without an experienced IT department, the customer may not fully appreciate or understand. Additional overage costs may be added for transactional volumes, concurrent users, peak amounts of bandwidth or processing demands, turning what looked like a good fit on paper into a challenge of how to contend with unexpected monthly costs and budget overruns.

Providers have come up with their own billing models which map to resource usage in different ways. This is often hard to measure and difficult to predict for applications. When deploying an application, it may be difficult to determine which billing model will the most cost effective based on the applications resource needs. These needs may vary depending on how the end users use the application, and until it's up and running the usage patterns may not be fully understood. Further, as the application scales and more users are added, the dynamics of how the application uses resources may also evolve and affect this mapping of resource use to optimal billing model.

When considering large scale applications with a large group of users, the hosting costs can be considerable. It would thus be highly desirable to have a system capable of providing threshold-based usage alerts to warn application owners of variations in application resource usage which may affect hosting costs. These changes could come from normal application scaling, or they could come from sub-optimal code patched into the release or from other such anomalies, including but not limited to denial-of-service style attacks.

The thresholds are not typically peak resource usage but a sustained usage pattern over time which may fit a pattern, such as usage at given times of the day, week, or month.

The thresholds may also incorporate some form of end user response time or metrics. In such cases, we may determine that even at a given level of resource use, response time may or may not be acceptable.

The system may employ various real time metrics such as active users, time of day, or other such metrics to the thresholds. These can be learned over time through monitoring the applications behavior as well as read from various system monitoring tools where available.

As an example, consider a time sheet logging application. Users fill in their time sheets daily, but in many cases, they fill them in weekly to meet a reporting deadline. Thus, while there are some burst of activities typically at the end of the shifts, Friday afternoons tend to be the busiest time. There are odd exceptions such as people taking time off, or people that were off sick which move the typical usage off the expected patterns but in general, the usage follows the expected patterns well when looking at a statistically large enough data set.

There are also known periods such as holidays where the end of the week might be a Thursday instead of a Friday, or the company may even be off for a longer period. Such exceptions are known and can be learned or pre-programmed into the system.

In such a system, most people have a fixed set of functions that are expected to take place when they enter their time. They log into the system, go to the time entry table, and enter the hours spent on each activity. Some may allocate all their time to one project and only enter one line; others may split up their tasks and enter multiple lines. Still further, supervisors may log in to check over and approve the time sheets and/or run reports for their executives. Once again, these activities will average out and we could predict how much CPU time, disk space, memory and bandwidth will be required for a company with a given set of employees using such a system.

In the example system outlined, it is possible to establish a set of bounds for resource utilization be accounting for the expected burst of activity on Friday with small variations on Mondays and Thursdays, and even smaller if not negligible usage at other times. In such a case, we can determine that for a company with a given number of employees using the system, an appropriately sized cloud hosting plan can be established to account for the expected usage. If we see, through monitoring, that the usage does not fall within the expected bounds it suggests that something may have changed, and action may be necessary.

In an extreme case, application bugs, security issues, or hacking attempts may have caused a large amount of usage. In such a case, no changes in terms of resource limits should be changed but an alert by the system may trigger other security related audits or tests.

In another case, there may be new processes or procedures put in place. Referring again to the example of the time sheet system, perhaps a manager has requested that all employees fill in their time daily instead of weekly. We may see that the change in system resource use is consistent, and we may adjust accordingly. In the alerting functions, the system can in fact identify the increased activity and report it as part of the thresholds being reached and bypassed.

Referring to FIGS. 1A and B, the drawings are largely similar except that the throttling application 10 may be a separate program installed in the hosting environment computers (FIG. 1A) whereas alternate embodiments could utilize the throttling application 10 as part of the underlying cloud software application, for example as portion of the cloud application 6 code or as an application wrapper or other implementation.

Therefore, the hosted computing environment 4 is provided with a cloud software application 6 executing thereon. This cloud hosting environment may be made up of a number of computer processors on e.g. servers as well as storages and various other networking hardware known in the art. The cloud software application 6 along with the usage throttling application 10 will execute on these various processor/computer hardware components of the hosting environment 4. Typically user computers 2 will access the cloud application 6 over the network via application usage 5. This generates a series of computing requests 8 within the hosting environment 4. These computing requests may result in disk 18 usage, processor 20 (CPU) usage, memory 22 (RAM) usage. Depending on the hosting plan model, the parameters associated with these values can be used to develop the bill for the application 6. This is not an exhaustive list of computing parameters that can be applied in the billing construct of the hosting provider, but are some examples. Others parameters would be known to those skilled in the art familiar with hosted services billing and implementation.

As these computing requests 8 are generates, the usage throttling application 10 intercepts the requests. Thresholds 14 may be received from a controller computer 12 which may simply be affiliated with a user with administrative privileges. These thresholds 14 may be stored with the throttling application 10 or may be received based on usage. The usage throttling application 10 can determine based on the computing requests 8 and history of requests and computing usage how to handle the incoming requests 8. This may include doing nothing other than passing the requests through. However, if adjustments can be made to the timing of the requests to reduce a parameter of usage, the throttling application can do this and also provide for an exchange of data in the form of throttling/performance data 16 to/from the controller computer 12. Particularly, this throttling/performance data can be provided to the controller computer so that the activities of the usage throttling application 10 can be monitored and adjusted. For example, if the thresholds set both a maximum cost and minimum performance level, there may be situations concerning when and how those two limits begin to conflict such that either there begin to be cost overages or performance level suffers. Thus, the throttling data can include information on what is being delayed by the usage throttling application 10 along with the resulting performance of the application as a result. The controller computer can then be used to modify thresholds 14 in response to that data. Over time, this data 16 provides the controller computer with a historical view of the application performance and the results of the throttling and its impact on cost (e.g. such as RAM, Processor and Disk usage and how that impacts cost under the provided hosting plan. The controller computer can both modify the thresholds or how the usage throttling application 10 selects and determines which requests to delay and which to pass on without delay in order to more efficiently manage hosting costs while maximizing performance of the application within those desired cost parameters.

Figure 2:
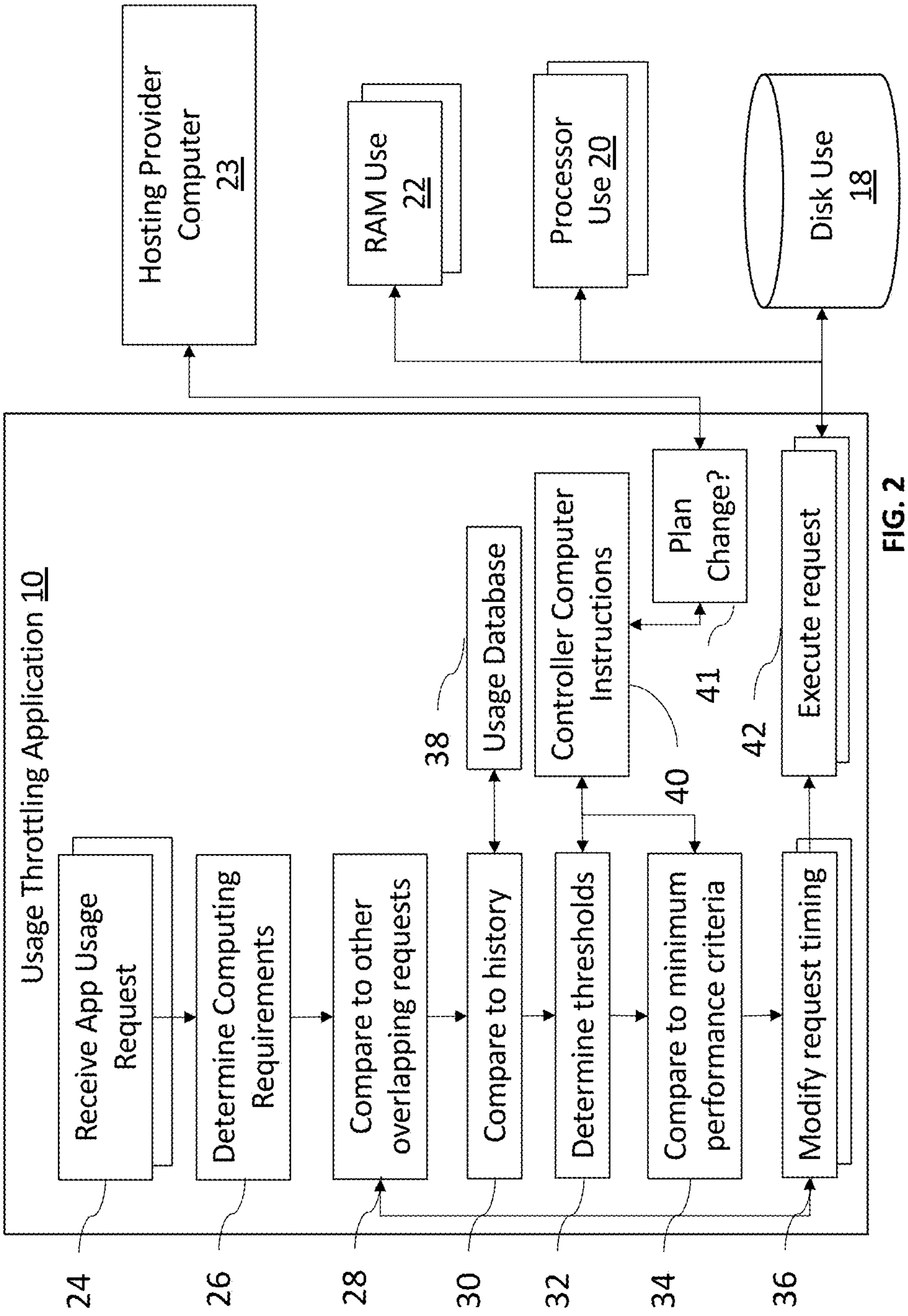
FIG. 2 is a functional flow diagram showing further detail on features of FIGS. 1A and B.

FIG. 2 provides further detail on the usage throttling application logic. Specifically, the usage request 24 is received by the throttling application. This may be various computing requests that would result in RAM 22, Processor 20, Disk 18 or other usage of the hosted resources. Next, the computing requirements 26 are determined based on the received usage request 24 which may include multiple requests/routines that create computing usage. One or more request and/or its components can be compared to other requests/components to determine if there are requests which are overlapping. For example, an overlapping request could be a pair of requests in which one may start earlier but continue to utilize computing resources as the next one starts. The overlapping requests can include multiple requests staggered at various times. When request timing is modified 36, a feedback loop can be used to re-compare the modified timing to overlapping requests. In the instance where a number of requests are going to drive bandwidth higher if processed simultaneously or in an overlapping manner, it can be useful to stagger the requests. For example, if there are 10 discreet requests which overlap, the time where all requests overlap can result in a significant driver and increase in bandwidth which can result in overages either as to the hosting plan or as to the computing capacity of the computing resource itself (or both). Thus, the requests can be paired so that they do not overlap and as a result, the total bandwidth would look more like 5 discrete requests spaced out over a longer period of time (which is still very short in terms of fractions of a second). As a result, the bandwidth load is reduced and the corresponding cost or strain on the processors/hardware is reduced. However, these 5 pairings of requests with modified timing could now overlap with other requests and create a piling of overlapping requests at different stages, thus the feedback loop between the modified request timing 36 and the comparing to overlapping requests 28 can result in more optimal selection. It is also understood that the comparison 28 can constrain limits on what requests can and cannot be moved based on what additional overlaps might be created by the modified timing. With the comparison in mind, the usage history 30 may also be looked at. This history 30 may be more relevant to disk usage where total disk usage is the driver of the cost causing usage. This is in contrast to bandwidth which may be a rate of usage (e.g. a maximum) as opposed to a sum total of usage. Thus, when the sum of total usage is the driver of costs, the history of usage from the database 38 may be a better indicator of anomalies. For example, if usage patterns are that every Friday there is a relatively large amount of disk usage and this pattern is expected and repeatable, a high rate of usage is not concerning in general and no adjustments may be needed. However, if a high rate is happening on Friday and the end of a month is Saturday, the better course of action would be to delay that disk usage until the next billing cycle assuming the total usage is close to the plan maximum on Friday. This would avoid an overage. The same could be done for a mid-week billing cycle changeover as well, but this may result in an override, depending on needs. Such override could be accomplished by a comparison to minimum performance criteria 34 both in this instance and as to other computing parameters that drive cost. This minimum performance criteria can be used to override thresholds 32 which would otherwise be applied. Thus, all of the comparison of overlapping requests 28, the history 30, threshold determination 32, minimum performance criteria 34 can be input into the system for determining the modified request timing 36. Once the modified timing is determined, the requests 24 are executed 42 according to that modified timing.

When the thresholds 32 and minimum performance criteria 34 are considered, external input form the controller computer 40 can be included. These comparisons can include sending data to the controller computer indicating what request timing is being modified to 36 and how this is impacting app performance. While communication with the controller computer will likely not happen to delay particular requests, an input may be provided to re-set the thresholds and to adjust the minimum performance criteria as well as the interplay between the two and when threshold overrides are executed and when they are not. In some instances the controller computer 12 instructions 40 may include a plan change 41 which would then be communicated to the cloud hosting provider computer 23 and result in threshold and/or minimum performance setting changes.

Figure 3:
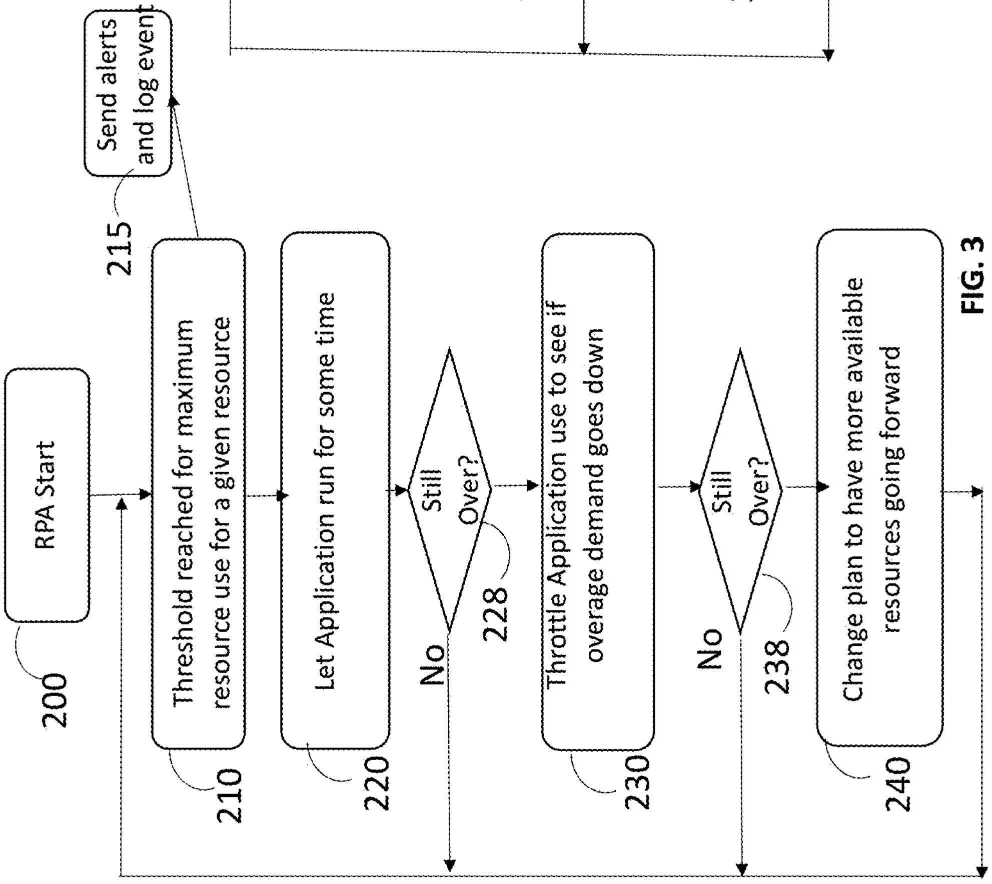
FIG. 3 is a functional flow diagram showing threshold logic which can be used in FIGS. 1A/B-2.

FIG. 3 shows an example flow chart for the Robotic Process Automation system 200. With the set thresholds for a given resource, the software can determine if the threshold is exceeded 210. Since the usage increase could be temporary, an alert can be issued 215 to the controller compute 12 and the application can be allowed to run for some time 220. If the usage reduces the monitoring can remain in place, but if the usage is still over 228, the application can be throttled 230 with modified request timing as described herein. If this modified request timing cannot be implemented in a manner that gets below the threshold 238 while still maintaining adequate performance, the plan may be changed 240 or more resources reserved.

Figure 4:
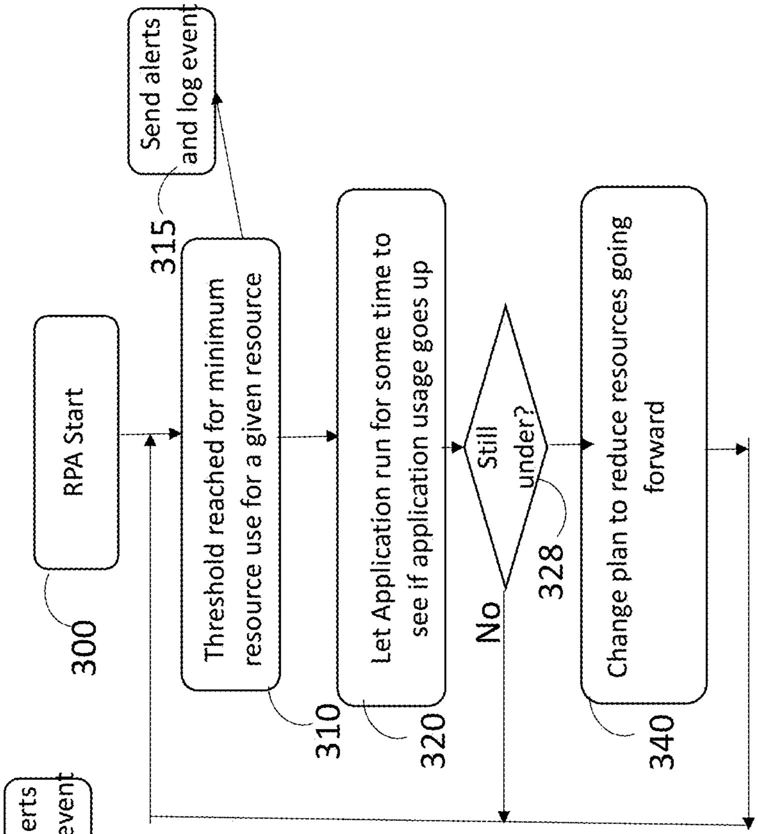
FIG. 4 is a functional flow diagram showing threshold logic which can be used in FIGS. 1A/B-2.

The reverse situation is shown in FIG. 4 in which too many resources could be reserved. Thus this RPA monitoring 300 can see if the minimum usage is met to justify reservation of the requests and a log and alerts can be sent 315 if the threshold is exceeded (i.e. minimum not met). The application may be allowed to run for some time 320 and if still under usage thresholds 328, the plan may be changed 340 to reduce reserved resources to be better aligned with what the application actually needs.

Figure 5:
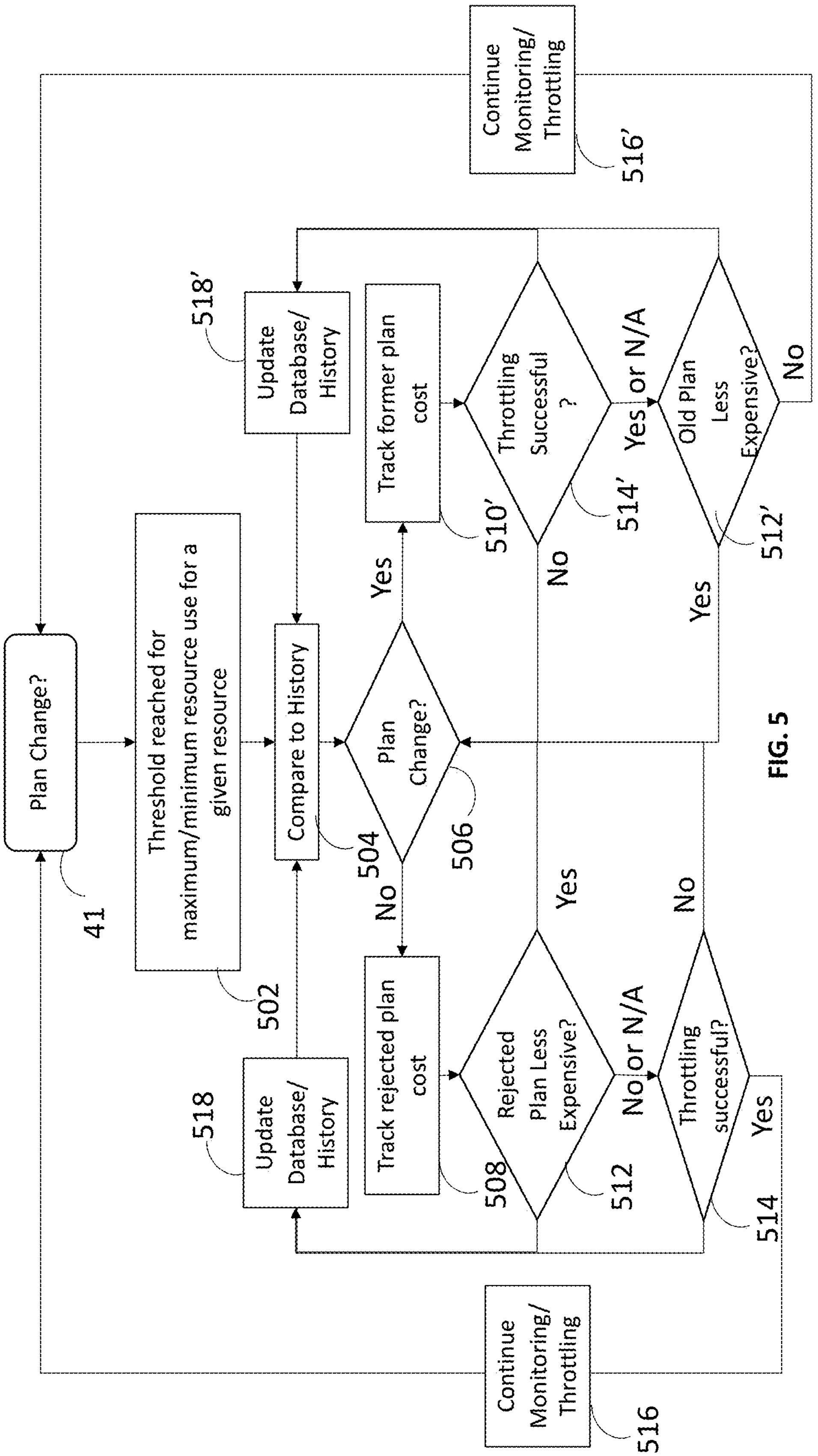
FIG. 5 is a functional flow diagram showing plan change logic details for FIG. 2.

FIG. 5. Shows the use of historical data from both events and savings obtained and how it is used in the decision making process of whether to change plans or not. Thus, if a plan change may be indicated 41, this is usually based on a threshold being reached 502. This threshold could be usage passing beyond a certain maximum indicating the possibility that too small of a plan is in place and that overage charges may be incurred. This threshold could also be usage passing beyond a minimum indicating the possibility that too large of a plan is in place such that too much is being paid for. This threshold can be set based on the plan or by a user or based on combinations thereof and different thresholds can be employed for each of the different metrics which drive cost of hosted services. Further, the threshold settings may be based on a number of factors. For example, some host providers offer elastic hosting services where the computing power grows with demand. As these services are often on demand, the hosting provider will charge a higher price for that usage which is purely elastic (i.e. expanding and contracting based on usage). It is also possible to have a plan with reserved instances where these computing resources have pre-defined capabilities in terms of e.g. memory, disk, processing, bandwidth or other metrics. Because the instance is reserved and the host will charge less per unit of the different metrics, but if nothing or less is used, the charge would remain the same. Furthermore, some providers offer the ability to do a hybrid of a reserved instance with elastic above the capabilities of what is reserved. Thus, the decision on how much to reserve can drive costs lower or potentially too high if more is reserved than reasonably needed.

The threshold comparison 502 allows the software application to determine if usage is trending or is outside plan limits or is likely to reach that stage. Not every time the threshold is reached will it be indicated to change the hosting plan. Temporary spikes or lulls in usage might be short lived such that changing to a different plan each time the threshold is crossed would be counterproductive. A feedback loop is therefore provided so that a history comparison 504 allows for intelligent decisions on plan changes to be made based on how the particular application's usage profile has varied/changed and/or in comparison to other software applications and/or based on cost/savings history associated with various plan changes made over time (which may be also compared to usage changes at various times). Thus, the history comparison involves accessing history data related to both costs and usage for the particular software application and/or other software applications which also utilized the cloud hosting provider. Based on the threshold being reached 502 and the history comparison 504, the decision is made whether to make a plan change 506. If the decision is to not make a change, the system also tracks the rejected plan cost 508 i.e. tracks the cost of the plan that would have been used if the decision were made to change the plan. The rejected plan tracked may be one plan or multiple different plan options that were considered. In tracking the plans (both current and rejected plan(s)), a cost comparison is done 512. If the rejected plan(s) were less expensive, the decision to change plans 506 is considered again in comparison to the threshold 502 and history 504. In this case, the history 518 is updated so that the decision whether or not to change plans has additional more specific data points, particularly one where the decision to change plans was a "NO" but should have been a YES. Further, if throttling is used and the rejected plan is still more expensive, the system determines if throttling is successful 514. Throttling may be effective at reducing costs, but can be considered unsuccessful if performance suffers. Thus, if throttling is slowing down the application to a undesirable performance level, a plan change 506 may then be considered. The results of the throttling whether successful or not are also included in the database/history update 518 so that plan changes again have more up to date and specific data points to the specific cloud software application being monitored/throttled. If in the throttling comparison 514 the throttling is determined to be successful, the system continues the monitoring and throttling process 516 and the feedback loop continues monitoring the thresholds 502 in comparison to computing usage. On the other side of the chart, the plan change decision 506 is YES and thus, the former plan cost is tracked 510'. In some cases, the decision to change plans may be to go to a lower cost/commitment plan and rely on throttling to control use. Thus, the system will determine if throttling is successful 514' much in the same way as in throttling monitoring 514. If throttling is unsuccessful, a plan change 506 may be considered. It is also possible that the switch to a new plan was a bad one and that the old plan is less expensive, thus a comparison 512' is made and plan changes are considered 506. If the old plan is more expensive, the system continues to monitor/throttle 516'. As further shown the database and history are updated 518' at the various stages of throttling monitoring 514' and previous plan comparisons 512'. It is also understood that comparison to the rejected plan 512 and/or throttling inquiry 514' may not be used, depending on the plans selected.

In determining if a plan change 506 is indicated weights are created and assigned to scenarios of usage which help to determine a successful outcome when deciding to change plans. For example, if memory use is high and a change is made to a more costly plan but which comparatively is less expensive given the increased memory use, it may end up that the memory use subsides and the plan change is not indicated or instead that a temporary switch should be made. In future, we can determine that the decision making will factor in the data updates 518/518' and may instead opt to wait a longer time before deciding to change plans 506. Similar scenarios can apply to other parameters such as bandwidth, disk and processing.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A computer implemented method for managing hosted computing resource usage by applications comprising:

intercepting, with a software program executing on a computer, computing requests by a software application executing on at least one of a plurality of computing resources, the software application associated with one or more usage costs which relate use of the computing resources to a cost of executing said software application on the at least one of the plurality of computing resources;

implementing, with the software program, a delay for one or more of the computing requests which were intercepted from the software application such that by implementing the delay the software program causes one or more of the computing requests intercepted from the software application to be executed at a later time and such that by implementing the delay the software program causes one or more parameters of use of the computing resources for the software application to remain below one or more thresholds in order to reduce the cost of executing said software application on the at least one of the plurality of computing resources.

2. The method of claim 1 wherein the one or more parameters of use are selected from the group consisting of bandwidth, disk, memory (RAM) and processing (CPU).

3. The method of claim 1 wherein the one or more thresholds are indicative of a total amount of usage of the one or more parameters for a defined period of time.

4. The method of claim 1 wherein the software program is part of the software application.

5. The method of claim 1 further comprising delaying the one or more of the computer request in accordance with the delay.

6. The method of claim 1 wherein the threshold is set based on instructions from a controller computer via a network based on data received from the software program concerning one or more implemented delays and performance of the software program with the one or more implemented delays.

7. The method of claim 1 further comprising, determining that a minimum performance level cannot be met with the delay and then changing the threshold.

8. The method of claim 1 wherein the computer is one of the plurality of computing resources.

9. A system for managing hosted computing resource usage by applications comprising:

a software program executing on a computer, the software program intercepts computing requests by a software application executing on at least one of a plurality of computing resources associated with a first hosting provider, the software application associated with one or more usage costs which relate use of the computing resources to a cost of executing said software application on the at least one of the plurality of computing resources;

the software program implementing a delay for one or more of the computing requests which were intercepted such that by implementing the delay the software program causes one or more of the computing requests intercepted from the software application to be executed at a later time and such that by implementing the delay the software program causes one or more parameters of use of the computing resources remain below one or more thresholds in order to reduce the cost of executing said software application on the at least one of the plurality of computing resources.

10. The system of claim 9 further comprising:

the software program delaying the one or more of the computer request in accordance with the delay so that use of the computing resources remain below the one or more thresholds but above a minimum performance level for the software application.

11. The system of claim 9 wherein said software program modifies the one or more thresholds if the software program determines that a minimum performance level for the software application cannot be met with the delay.

12. The system of claim 11 wherein the minimum performance level is a multiple of an average or median load time for one or more categories of requests.

13. The system of claim 9 wherein the one or more thresholds are usage thresholds indicative of a limit on cost.

14. The system of claim 9 wherein the one or more thresholds are a limit on bandwidth, disk, memory, processing or combinations thereof.

15. The system of claim 9 wherein the delay is based on historical usage of computing resources by the software application.

16. A system for managing hosted computing resource usage by applications comprising:

a software program executing on a computer, the software program intercepts a plurality of computing requests by a software application executing on at least one of a plurality of computing resources associated with a first hosting provider, the software application associated with one or more usage costs which relate use of the computing resources to a cost of executing said software application on the at least one of the plurality of computing resources;

the software program determining a delay for two or more of the plurality of computing requests so that one or more parameters of use of the computing resources remain below one or more thresholds, the delay determined based on the plurality of computing requests being within a range of times such that un-delayed execution of the plurality of computing requests would overlap, the delay resulting in the software program implementing the two or more of the plurality of computing requests such that at least one of the two or more of the plurality of computing requests starts at a later time as compared to without the delay.

17. The system of claim 16 wherein the two or more of the plurality of computing requests are selected by the software program based on a threshold associated with a maximum bandwidth.

18. The system of claim 17 wherein the maximum bandwidth is modified based on a contribution to the cost of executing said software application on the at least one of the plurality of computing resources, the contribution being associated with parameters of use other than bandwidth.

19. The system of claim 16 wherein the one or more thresholds are received from a controller computer which is in communication with the software program via a network.

20. The system of claim 16 wherein the computer is one of the plurality of computing resources.

* * * * *